Jan. 3, 1967  S. SHAPIRO ET AL  3,295,150
DECORATIVE BED COVER
Filed May 9, 1966  2 Sheets-Sheet 1
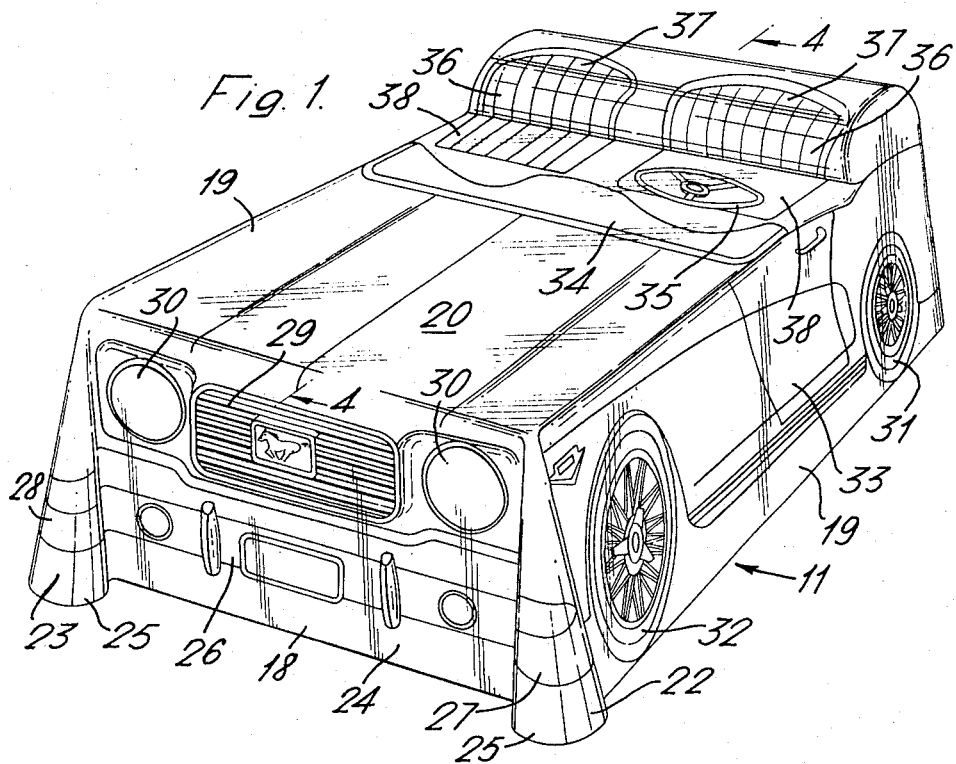
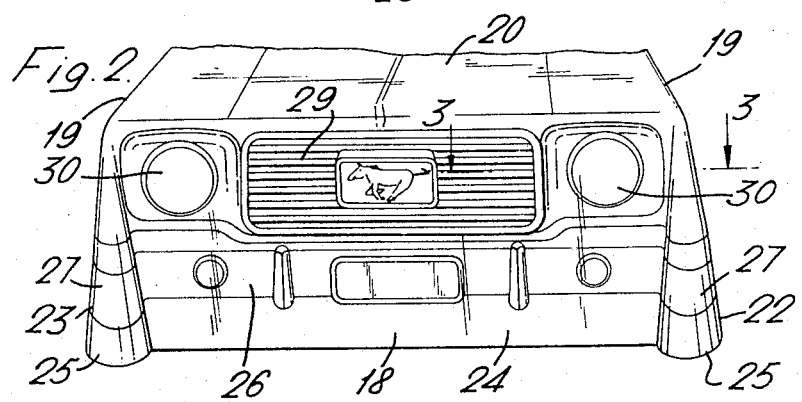
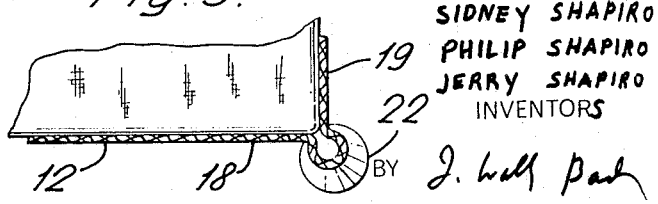
SIDNEY SHAPIRO
PHILIP SHAPIRO
JERRY SHAPIRO
INVENTORS
BY J. Well Park
ATTORNEY Jan. 3, 1967  S. SHAPIRO ET AL  3,295,150
DECORATIVE BED COVER
Filed May 9, 1966  2 Sheets-Sheet 2
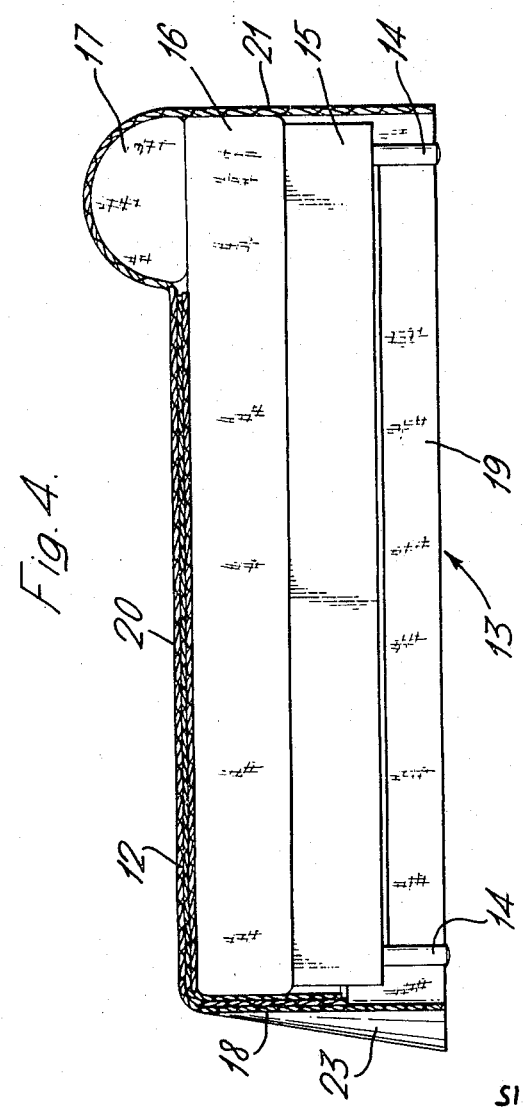
SIDNEY SHAPIRO
PHILIP SHAPIRO
JERRY SHAPIRO
INVENTORS
BY J. Lett Bush
ATTORNEY

United States Patent Office 3,295,150
Patented Jan. 3, 1967

3,295,150
DECORATIVE BED COVER
Sidney Shapiro and Philip Shapiro, New York, and Jerry Shapiro, Mamaroneck, N.Y., assignors to Inventions of North America Limited, Ottawa, Canada, a corporation of Canada
Filed May 9, 1966, Ser. No. 548,477
3 Claims. (Cl. 5—334)

This invention relates to a decorative bed cover which, in combination with a bed, consists of bed-bed covering combination to realistically resemble an automobile.

The instant invention constitutes improvement to our co-pending application, Serial No. 470,987 filed July 12, 1965, now U.S. Patent No. 3,266,063.

The specific bed covering disclosed in this application is separately claimed in our co-pending application, Serial No. 556,794, filed May 9, 1966.

The instant application relates specifically to the bed-spread-bed combination which realistically resembles an automobile.

One of the objects of the instant invention is to produce a bed covering which when draped upon a bed will give the illusion of an automobile. However, in a device of the class described, it is also desirable, particularly where children are concerned, to allow the children to "play with" the bedspread and to believe themselves to be traveling in an automobile. Therefore, not only must the bedspread-bed combination realistically resemble an automobile but the child must be given the opportunity to "ride" in the automobile.

Obviously, if an auxiliary seat were placed in juxtaposition with the bedspread, the entire object of this invention would be destroyed. The bedspread would no longer be easily washable, the parent would have to place the seat in position, the child could be injured by movement of the seat and other untoward disadvantages would occur.

It is, therefore, one of the objects of this invention to produce a bed covering which will have an *actual seat* for the child if it desires to play with the bedspread and imagine that it is riding in an automobile but, at the same time, to have no other structure than the conventional bed-bedspread combination.

The object of the instant invention is accomplished by providing a representation of a seat upon the top portion of a bedspread planarly and positionally inscribed thereupon. The seat portion has a front portion and a back portion and the back portion of the seat is disposed directly above a pillow which is placed upon the bed so that an actual three-dimensional seat is provided. The front portion of the seat is, of course, normally adjacent the top portion of the bedspread forward of the pillow.

The above constitutes a brief description of the instant invention and some of the objects and advantages of this invention will become apparent as the description proceeds.

The invention will now be further described by reference to the accompanying drawings which are made part of this application.

FIG. 1 is an isometric perspective view of a bed cover made in accordance with this invention showing the position that the part of the invention assumes when the bed cover is draped over a bed.

FIG. 2 is a detailed fragmentary front perspective view of the front portion of the bed spread shown in FIG. 1 in the position shown in FIG. 1.

FIG. 3 is a fragmentary cross-sectional view taken along line 3—3 of FIG. 2.

FIG. 4 is a cross-sectional view of the structure shown in FIG. 1 taken along line 4—4 of FIG. 1.

The invention will now be further described by reference to the specific form thereof as set forth in the accompanying drawings.

In this connection, however, the reader is cautioned to note that the specific form shown herein is merely for illustrative purposes and for purposes of example only. Various changes and modifications can obviously be made within the spirit and scope of this invention and would occur to those skilled in this art.

Now referring to the specific form of the invention as set forth in the drawings herein for a detailed description thereof, the bed cover 11 of this invention is formed of a fabric body 12 made of a substantially planar material. As examples of the fabric that could be utilized, reference is made to various woven fabrics of cotton, wool and various synthetic fibers, non-woven fabric, knitted fabric, and various others.

The bed covering 11 is draped over a bed 13 which conventionally consists of a pair of legs 14, a spring portion 15, a mattress portion 16, and a pillow 17.

Body 12 of bed cover 11 is formed with a front portion 13, a plurality of opposite side portions 19, a top portion 20, and a rear portion 21. Front portion 18 is formed with a pair of oppositely disposed forwardly extending end portions 22 and 23 and an intermediate portion therebetween 24. Portions 22 and 23 are preferably also outwardly extending and flared, the flaring having its greatest dimension at the bottom portion 25 of each of portions 22 and 23.

The representation of the front bumper of an automobile 26 is positionally inscribed upon portion 24 and said representation extends continuously over portion 22 and 23 as indicated by reference character 27 and 28.

Front portion 18 also carries a representation of the grille portion of an autombile 29 and headlights 30. As shown clearly in FIG. 1 and 2 of the drawings, the representations of the grille portion of the automobile is illusorily made so that it apparently projects forwardly and the representation of the headlight portion are illusorily indented inwardly. Actually, of course, these representations are inscribed in planar form and actually do not project forwardly or are indented inwardly.

Side portions 19 of bed cover 11 also preferably bear the representation of wheel portions of a vehicle 31 and 32 and a representation of a door portion 33. Top portion 20 of cover 11 of this invention also preferably bears a representation of a windshield portion of a vehicle 34 and a steering wheel portion of a vehicle 35. Top portion 20 also bears a representation of a seat portion of a vehicle 36 which is divided into a back portion 37 and a front portion 38.

Back portion 37 is designed to be disposed directly above pillow 17.

The operation of the instant invention is as follows:

A conventional bed is procured with a pillow 17 placed at the head of the bed. The bed cover 11 of this invention is then disposed from the bed in the position shown in FIG. 1 of the drawings. The back portion 37 of seat 36 is then disposed adjacent pillow 17. The child now sits upon the bed with his back directly supported by portion 37 which in turn is supported by pillow 17. Thus, the child can obtain the illusion of riding in an actual automobile.

The foregoing sets forth the manner in which the objects of this invention are achieved.

We claim:
1. In combination, a bed, a pillow upon said bed, a bed cover disposed over said pillow and said bed, said bed cover comprising a fabric body made of a substantially planar material, said body having a front portion, a top portion, and a plurality of side portions, said top portion having the representation of a seat portion of a vehicle planarly and positionally inscribed thereupon, said seat portion having a front portion and a back portion, said back portion of said seat disposed directly above said pillow so as to produce an actual three dimensional seat.

2. A combination as described in claim 1 said bed cover having representations of the wheels of a vehicle upon the side portions thereof and representations of the headlight and grille portions of a vehicle planarly and positionally inscribed upon the front portion thereof.

3. A combination as described in claim 2 said bed cover having representations of the steering wheel and windshield portions of a vehicle planarly and positionally inscribed upon the top portion thereof forward of said seat representation.

References Cited by the Examiner

UNITED STATES PATENTS

| | | | |
|---|---|---|---|
| 1,764,764 | 6/1930 | Stewart | 5—334 |
| 3,099,443 | 7/1963 | Koch | 46—11 X |
| 3,120,721 | 2/1964 | Bukatman et al. | 5—334 |
| 3,266,063 | 8/1966 | Shapiro | 5—334 |

FRANK B. SHERRY, *Primary Examiner.*

A. CALVERT, *Assistant Examiner.*